July 3, 1928.  W. H. O'CONNOR  1,675,765
ROTARY CUTTING HEAD
Filed April 21, 1925
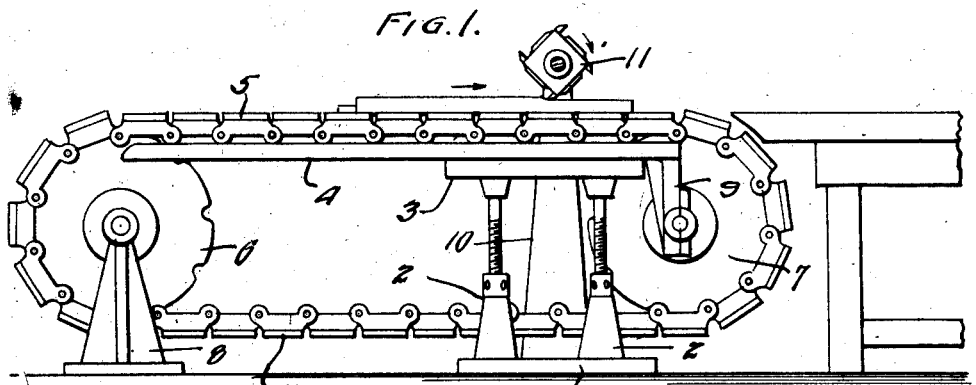
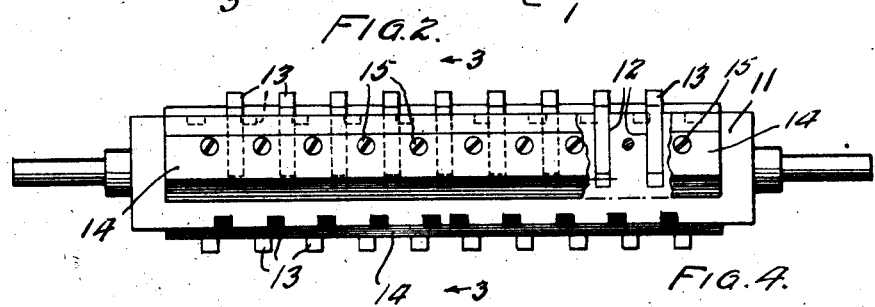
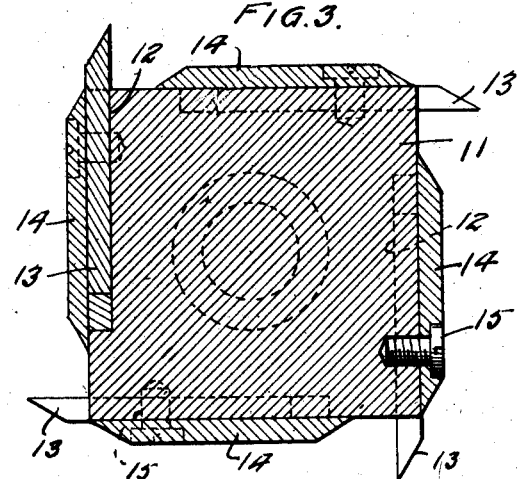
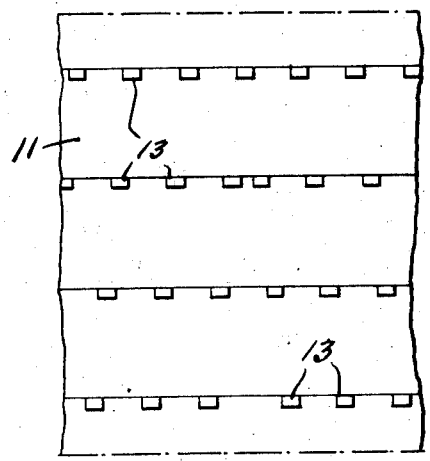
Inventor
William H. O'Connor
By Semmes & Semmes
Attorney Patented July 3, 1928.

1,675,765

UNITED STATES PATENT OFFICE.

WILLIAM H. O'CONNOR, OF EAST ORANGE, NEW JERSEY, ASSIGNOR TO JOHN F. CONROY, SR., OF EAST ORANGE, NEW JERSEY.

ROTARY CUTTING HEAD.

Application filed April 21, 1925. Serial No. 24,893.

This invention relates to rotary cutting heads.

An object of my invention is to provide a rotary cutting head for surfacing or leveling raw materials.

Another object of my invention is the production of a rotary cutting head particularly applicable for slabs, such as zenitherm, which is of an abrasive nature and quickly dulls the cutting edges of a bit.

Another object of this invention is the production of a cutting head which, owing to the particular arrangement of the bits, will permit of making a deeper cut than can be made by any of the cutting heads now in general use.

Another object of this invention is the production of a rotary cutting head having a series of cutting blades so arranged that only a portion of the blades will come in contact with the material under treatment at one and the same time. Since the blades are narrow and are spaced apart, they can penetrate the material under treatment to a greater depth than would be the case where the bit extends the entire length of the cutting head.

Another object of this invention is the production of a rotary cutting head having a reduced cutting surface, the reduction being of such a nature as to sub-divide the cutting surface and thus permit of a deeper cut, so that with less cutting surface a larger percentage of the material under treatment can be removed with less bit action.

A further object of this invention is the production of a cutting head having a series of bits so arranged as to prevent the material under treatment from sliding to either side or end of the cutting head.

A still further object of this invention is the production of a rotary cutting head having a series of bits arranged thereon in oppositely disposed spirals. The spaced relation of the bits to each other is such that the material under treatment will not be exposed to the hammer or knock such as would be imparted to it under the treatment of a bit equal to the length of the cutting head.

A still further object of my invention is the production of a rotary cutting head which will produce high efficiency in operation and yet marked simplicity as a whole and in respect to each of its component parts, so that its manufacture is economically facilitated both as regards to parts and its assembly.

With these and other objects in view, which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification:

Figure 1 is a side elevation of a caterpillar table with my improved rotary cutting head in position;

Fig. 2 is a side elevation of a rotary cutting head with bits in position;

Fig. 3 is a cross sectional view taken on line 3—3 of Fig. 2;

Fig. 4 is a diagrammatical illustration showing the position of the bit; and

Fig. 5 is a perspective view of one of the bits.

Referring by numerals to the drawings, 1 represents the base of a table having mounted thereupon adjustable uprights 2 supporting a top 3. The top 3 supports a guideway 4, upon which travels a caterpillar feed 5. The caterpillar is mounted upon suitable sprockets 6 and 7 journaled on brackets 8 and 9.

Mounted in a suitable upright 10, immediately above the caterpillar 5, is a rotatable cutting head 11. Mounted upon the cutting head 11 in slots 12 are the bits 13, over which are fitted plates 14 held in place by set screws 15. The bits 13 are adjustable within the slots 12, and are arranged in the form of oppositely disposed spirals. In other words, the cutting bits 13 are so arranged within the cutting head 11 that they are staggered in spaced relation to each other and in such a manner that the bits slightly overlap the cutting path of the preceding row of bits, the object being that by such an arrangement of the bits they may be set to cutting in a greater depth than would be the case with a bit extended from one end of the cutting head to the other.

It will also be seen that by such an arrangement of the bits upon the cutting head, any side motion of the material under treatment is prevented by reason of the fact that the material is engaged by a like number of teeth on each side of the center of the cutting head.

Since in the surfacing of material, the cutting head makes about 500 revolutions per inch of feed, and having four blades extending from end to end of the cutting head hitting per revolution, each bit takes off only one-two thousandths of an inch; thus, the bits would become very dull after a very short usage, especially in materials of an abrasive nature. Since in my construction the cutting head only makes eight revolutions per one inch of feed and the bits hit only once per revolution, each bit taking off one-eighth of an inch, it will be readily understood that the life of the bit is prolonged.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

Having thus described the various features of my invention, what I claim as new and desire to secure by Letters Patent is:

1. In a rotary cutting head a shaft having a rectangular body portion, a plurality of slots in each face of the rectangular body portion, and plates mounted upon the faces of the body portion over the slots.

2. A rotary cutting head comprising a shaft, a rectangular body portion on the shaft, a plurality of slots in each face of the rectangular body portion, bits in the slots, and plates mounted upon the faces over the bits.

3. A rotary cutting head comprising a shaft having a spindle at each end, a rectangular body portion intermediate the spindles, a row of parallel slots in each face of the rectangular body portion, bits mounted in the slots, and plates to secure the bits in position.

4. A rotary cutting head comprising a shaft having a spindle at each end, a rectangular body portion intermediate the spindles, a row of parallel slots in each face of the rectangular body portion, the slots in one row being staggered with respect to the slots in the other rows, bits mounted in the slots, and plates for securing the bits in position.

5. A rotary cutting head comprising a shaft having a spindle at each end, a rectangular body portion intermediate the spindles, a plurality of parallel slots in each face of the rectangular body portion, the slots in each face being in staggered spaced relation to the slots in the other faces, bits mounted in the slots, and means for securing the bits in position.

6. A rotary cutting head comprising a shaft having a spindle at each end, a rectangular body portion intermediate the spindles, rows of parallel slots in each face of the rectangular body portion, the slots in each row overlapping the slots in the preceding row, bits mounted in the slots, and means for securing the bits in position.

7. A rotary cutting head comprising a shaft having a spindle at each end, a rectangular body portion intermediate the spindles, a row of parallel slots in each face of the rectangular body portion, the slots being arranged from a central slot in one of the faces in pairs to the right and left in each succeeding face, bits mounted in the slots, and means for securing the bits in position.

8. A rotary cutting head comprising a shaft having a spindle at each end, a rectangular body portion intermediate the spindles, a row of parallel slots in each face of the rectangular body portion, the slots being arranged from a central slot in one of the faces in pairs, one slot on either side of a central line through the central slot, bits mounted in the slots, and means for securing the bits in position.

9. In a rotary cutting head a shaft having a rectangular body portion, a row of parallel slots arranged in each face of the rectangular body portion, the slots in each row staggered with respect to the slots in the other rows, and a plate mounted on each face over the rows of slots.

10. A rotary cutting head comprising a shaft having a rectangular body portion, a row of slots in each face of the rectangular body portion, the slots extending from each edge of the body portion inwardly in spaced relation parallel to each other, the slots in each row staggered with respect to the slots in the other rows, bits fitted snugly in the slots flush with the faces, and a plate mounted upon each face over the bits.

In testimony whereof I affix my signature.

WILLIAM H. O'CONNOR.